United States Patent [19]
Okada et al.

[11] Patent Number: 6,040,034
[45] Date of Patent: Mar. 21, 2000

[54] LAPPING TAPE

[75] Inventors: Kesao Okada; Shigeo Kurose, both of Saku, Japan

[73] Assignee: TDK Corporation, Tokyo, Japan

[21] Appl. No.: 09/064,312

[22] Filed: Apr. 23, 1998

[30] Foreign Application Priority Data

Apr. 25, 1997 [JP] Japan .................................. 9-123198

[51] Int. Cl.⁷ ...................................................... D06N 7/04
[52] U.S. Cl. ........................... 428/143; 428/147; 428/149
[58] Field of Search ................................... 428/143, 147, 428/149

[56] References Cited

U.S. PATENT DOCUMENTS 4,954,140 9/1990 Kawashima et al. ...................... 51/295

FOREIGN PATENT DOCUMENTS 53-44714 11/1978 Japan .
7-276246 10/1995 Japan .

*Primary Examiner*—Christopher Raimund
*Attorney, Agent, or Firm*—Oblon, Spivak, McClelland, Maier & Neustadt, P.C.

[57] ABSTRACT

Described is a lapping tape having, on a flexible substrate, a lapping layer formed by coating a paint for the formation of a lapping layer which contains inorganic powders, a binder and solvents, and then drying. In the lapping tape according to the present invention, the solvents in the paint contain an organic solvent having a boiling point of 120° C. or higher in an amount of 20 to 60 wt. % based on the total amount of organic solvents; the lapping layer has a thickness of 3 to 25 $\mu$m; and the remaining amount of the solvents in the lapping layer is 500 g/m³. The present invention therefore brings about excellent advantages that the lapping scratches on the surface to the lapped can be prevented to the utmost; peeling of the lapping layer from the lapping tape can be suppressed; and the lapping tape has excellent lapping ability.

7 Claims, 1 Drawing Sheet

LAPPING TAPE

BACKGROUND OF THE INVENTION

1. Field of the Invention

The present invention relates to a lapping tape used for lapping of the surface of a magnetic head, magnetic disk or the like.

2. Description of the Related Art

A lapping tape which has a lapping layer formed on a flexible substrate is used for the precision finish processing of a magnetic head or surface finish processing of a magnetic recording medium. The lapping layer is formed by coating a paint for the formation of a lapping layer onto a flexible substrate, followed by drying. The paint for the formation of a lapping layer contains, in the kneaded or dispersed form, inorganic powders such as aluminum oxide, chromium oxide, silicon carbide, iron oxide, silicon nitride or diamond; an organic binder such as polyvinyl chloride resin, polyester resin or polyurethane resin; and other compounding agents.

As a conventionally known process for producing a lapping tape, there is a process as described in Japanese Patent Publication No. SHO 53-44714 which comprises heating an abrasive in the form of fine particles, mixing the resulting particles with a saturated polyester resin adhesive solution under stirring, filtering the resulting mixture through a filter, adding a hardener prior or subsequent to the filtration, coating the mixture onto the polyester film uniformly, drying and rolling up the film so obtained, and curing the resulting film. It is reported that the above preparation process brings about effects for preventing the fine abrasive particles from falling from the film surface. It is however difficult to say that the lapping tape so prepared has sufficient lapping ability.

In Japanese Patent Application Laid-Open No. HEI 7-276246, proposed is a lapping tape which has, on a flexible substrate, a lapping layer composed mainly of abrasive particles and a binder resin and wherein an extracted amount from the lapping layer by using tetrahydrofuran (THF) is 0.1 to 3.0 wt. % based on the lapping layer. It also includes the description that the amount of the solvent remaining in the coated layer is controlled to 0.1 to 40 mg/m$^2$. An object of the lapping tape described in Japanese Patent Application Laid-Open No. HEI 7-276246, however, is to form a uniform chip streak on the surface of an electrophotosensitive drum for a copying machine, thereby bringing about a drastic improvement in the life of the photosensitive drum. The lapping tape is used exclusively for the above object and it does not seem to be suited to the lapping of a magnetic recording medium or magnetic head. In addition, in spite that the remaining amount of the solvent is indicated, it is only the indication of a numerical value and effects and advantages brought by the specification of the amount are not described specifically at all.

The present invention has been made in view of the foregoing situations. An object of the present invention is to provide a lapping tape which can prevent the occurrence of lapping scratches on the surface of the target to be lapped to the utmost, has a peeling-resistant of the lapping layer and has excellent lapping ability, upon lapping of the surface of a magnetic head or magnetic disk

SUMMARY OF THE INVENTION

With a view toward overcoming the above-described problems, the present invention has been constituted as follows. In one aspect of the present invention, there is thus provided a lapping tape having, on a flexible substrate, a lapping layer obtained by coating a paint for the formation of a lapping layer, which contains inorganic powders, a binder and solvents, and then drying, wherein said solvents contain an organic solvent having a boiling point of not less than 120° C. in an amount of 20 to 60 wt. % based on the total amount of organic solvents; the lapping layer has a thickness of 3 to 25 µm; and the remaining amount of the solvents in the lapping layer is not greater than 500 g/m$^3$.

In another aspect of the present invention, there is also provided a lapping tape wherein the remaining amount of said solvents falls within a range of from 20 to 500 g/m$^3$.

In a further aspect of the present invention, there is also provided a lapping tape wherein the remaining amount of said solvents falls within a range of from 20 to 400 g/m$^3$.

In a still further aspect of the present invention, there is also provided a lapping tape wherein said organic solvent having a boiling point of not lower than 120° C. is at least one solvent selected from the group consisting of cyclohexanone, xylene, butyl acetate and amyl acetate.

In a still further aspect of the present invention, there is also provided a lapping tape wherein said organic solvent having a boiling point of not lower than 120° C. is cyclohexanone.

In a still further aspect of the present invention, there is also provided a lapping tape wherein said solvents contained in the paint contain an organic solvent having a boiling point of not lower than 120° C. in an amount of 25 to 50 wt. % based on the total amount of organic solvents.

In a still further aspect of the present invention, there is also provided a lapping tape wherein said lapping layer has a thickness ranging from 5 to 20 µm.

In a still further aspect of the present invention, there is also provided the use of the lapping tape according to the present invention for lapping of a magnetic head or magnetic disk.

DETAILED DESCRIPTION OF THE PREFERRED EMBODIMENTS

Figure 1:
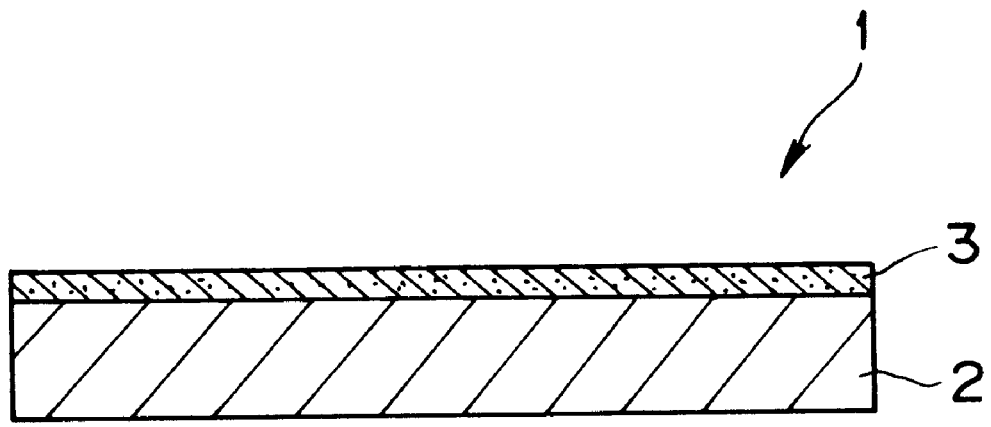
FIG. 1 is a schematic cross-sectional view of the lapping tape according to the present invention.

The preferred embodiment of the present invention will hereinafter be described with reference to FIG. 1.

FIG. 1 is a schematic cross-sectional view illustrating the embodiment of the lapping tape according to the present invention.

The lapping tape 1 according to the present invention has, on a flexible substrate 2, a lapping layer 3 for the lapping (cleaning) of the surface of a magnetic head or magnetic disc (which will hereinafter be called "the surface to be lapped", simply). This lapping layer 3 contains as essential components inorganic powders as an abrasive and a binder for binding these inorganic powders.

The lapping layer 3 of the present invention is formed by coating, on the flexible substrate 2, a paint for the formation of a lapping layer obtained by mixing and dispersing the above-described essential components and various additives, which are used as needed, together with (organic) solvents, followed by drying.

Such a lapping layer 3 is formed to have a film thickness of 3 to 25 µm, preferably 5 to 20 µm. Film thickness less than 3 µm deprive the elasticity of the film and will be a cause for scratching the surface to be lapped. Film thickness exceeding 25 µm, on the other hand, tend to cause such an inconvenience as the peeling of the lapping layer. Even if the above film thickness of the lapping layer 3 is satisfied, marked advantages of the present invention are not brought about only by it. Synergistic effects of the present invention will appear for the first time when further adding two factors, that is, the amount of the solvents remaining in the lapping layer 3, which will be described later, and use of a specific solvent for the paint are actualized in combination. Incidentally, the term "film thickness" of the lapping layer 3 as used herein means the thickness of the dried layer. The lapping layer 3 may be formed as a single coating layer or multiple coating layers.

As the inorganic powders contained in the lapping layer, those having a Mohs hardness not lower than 5 are preferred. Fine powders such as silicon carbide, aluminum oxide, silicon nitride, zirconium oxide, chromium oxide, diamond and emery are used either singly or in combination. Among them, silicon carbide and aluminum oxide are particularly suited. The inorganic powders have preferably a particle size falling within a range of about 0.1 to 20 µm. It is only necessary to select a proper particle size so as to satisfy the using purpose, for example, rough lapping or finish lapping. When the particle size is less than 0.1 µm, the lapping ability tends to become insufficient upon use for finish lapping. When the particle size exceeds 20 µm, on the other hand, inconvenience such as scratching the surface is apt to occur.

Examples of the binder (binder resin) contained in the lapping layer 3 include phenoxy resin, polyvinyl chloride copolymer, cellulose resin, polyurethane resin, polyester resin and polyether resin. These resins may be used either singly or in combination. Among them, the combination of a phenoxy resin and a polyurethane resin is suited.

The content of the binder in the lapping layer 3 is 5 to 50 parts by weight based on 100 parts by weight of the inorganic powders, with 10 to 40 parts by weight being particularly preferred. Contents of the binder less than 5 parts by weight lower the film strength of the lapping layer, thereby causing peeling of the film from the lapping layer. Contents exceeding 50 parts by weight, on the other hand, relatively lower the content of the inorganic powders, resulting in the inconvenience that sufficient lapping ability is not available.

In addition, a crosslinking agent is generally added in order to harden such a binder. As the cross-linking agent, various polyisocyanates, particularly, diisocyanate can be used. Particularly preferred is at least one of tolylene diisocyanate, hexamethylene diisocyanate and methylene diisocyanate. It is particularly preferred to use the above-exemplified crosslinking agents as a crosslinking agent, such as trimethylol propane, which has been modified to have a plurality of hydroxyl groups or as an isocyanulate type crosslinking agent which has three diisocyanate molecules bound each other. Such a crosslinking agent links the resin, binding with a functional group or the like contained in the above binder. The crosslinking agent is preferably contained in an amount of 10 to 30 parts by weight based on 100 parts by weight of the binder. For curing of the thermosetting resin, it is only necessary to heat the resin at 50 to 70° C. for 12 to 48 hours in a heating oven.

To the lapping layer of the present invention, additives having lubricating effects, antistatic effects, dispersing effects, plasticization effects and the like are added as needed. Specific examples include fatty acids, fatty acid esters, silicone oils, fluorine oil, various surfactants and carbon black.

For the formation of such a lapping layer, an organic solvent is included in the paint for the formation of a lapping layer, which has been prepared in advance.

Examples of the organic solvent usable in the present invention include ketones such as methyl ethyl ketone, methyl isobutyl ketone and cyclohexanone; aromatic hydrocarbons such as toluene and xylene; and esters such as ethyl acetate and butyl acetate. These solvents may be used either as a single solvent or a solvent mixture of a desired ratio. Among them, a high-boiling-point solvent having a boiling point not lower than 120° C. is essential and it is necessary to add it in an amount of 20 to 60 wt. %, preferably 25 to 50 wt. % based on the total amount of organic solvents of the paint. When the content of the high-boiling point solvent having a boiling point not lower than 120° C. is less than 20 wt. %, the organic solvent rapidly evaporates from the coating layer of the lapping layer in the case where the lapping layer is relatively thick with thickness of 3 to 25 µm, leading to a deterioration in the surface properties of the lapping layer. As a result, by the lapping operation using such a lapping tape, the surface to be lapped is inevitably scratched. When the content of the high-boiling point solvent having a boiling point not lower than 120° C. exceeds 60 wt. %, on the other hand, the amount of the solvent remaining in the lapping layer increases and a deterioration in the lapping ability and peeling from the lapping layer occur. Examples of the solvent having a boiling point of at least 120° C. include cyclohexanone, xylene, butyl acetate and amyl acetate. Among them, cyclohexanone is most preferred.

In the present invention, it is required to control the remaining amount of the solvents in the lapping layer to 500 g/m$^3$ or less (particularly, 200 to 500 g/m$^3$), preferably 450 g/m$^3$ or less (particularly, 20 to 450 g/m$^3$), more preferably 400 g/m$^3$ or less (particularly 20 to 400 g/m$^3$). Remaining amounts of the solvents exceeding 500 g/m$^3$ cause inconvenience that plasticity of the lapping layer is occurred and crosslinking reaction of the binder (resin) is inhibited, leading to a marked deterioration in the lapping ability and occurrence of peeling of the coating layer from a lapping layer. It is theoretically possible to reduce the remaining amount of the solvents to zero, but impossible in a practical experiment. As the remaining amount approaches zero, the surface to be lapped tends to be scratched. The suitable lowest limit is presumed to be 20 g/m$^3$. The suitable lowest limit which has been found experimentally is 20 g m$^3$. Incidentally, the remaining amount (g/m$^3$) of the solvents in the lapping layer of the present invention is of course the value after the lapping layer is dried. It is defined as described below. The specific measuring method is also described below.

Definition of the Remaining Amount of Solvents (g/m$^3$)

It is defined as the weight (g) of an organic solvent remaining in the unit volume (1 m$^3$) of the coated and dried film of a lapping layer.

Measuring Method of the Remaining Amount of Solvents

The total remaining amount of solvents in a lapping tape sample is found by measuring its layer thickness by a precision micrometer, hermetically sealing the sample, which has been cut into a piece of ¾ inch width×1 m length, into a 20-ml vial, leaving it alone at 120° C. for one hour and then measuring a gas generated in the vial by a head spacer gas chromatograph ("HSS-2A, GC-9A", product of Shimadzu Corporation). Then, the remaining amount of the solvents per unit volume is found from the coating thickness and the volume of the film obtained from the sample size.

The above remaining amount of the solvents may be controlled by changing the kind of the solvents employed, mixing ratio of the solvents employed, solid concentration of the paint for the formation of a lapping layer and drying conditions as desired.

The above-described paint for the formation of a lapping layer has preferably a solid concentration of 30 to 70 wt. %, more preferably 40 to 60 wt. %. Solid concentrations less than 30 wt. % increase the amount of the solvents remaining in the lapping layer, leading to the inconvenience that a uniform coating layer cannot be obtained owing to the Benard cell phenomenon. Solid concentrations exceeding 70 wt. %, on the other hand, increase the viscosity of the paint and the drying rate of the film of the lapping layer, resulting in the inconvenience that a uniform coating layer cannot be obtained.

As the flexible substrate 2, polyethylene terephthalate (PET), polyethylene naphthalate (PEN), polyamide, polyimide and polyamideimide films can be used in the present invention. It is possible to add as a filler an inorganic compound such as oxide or carbonate of Al, Ca, Si or Ti, or organic compound such as acrylic resin fine powders as needed. Among the above films, PET, PEN and aromatic polyamide films are preferred, with complex films obtained by multilayer co-extrusion of two or three kinds of PET and/or PEN films being more preferred. Such a flexible substrate may be subjected to corona discharge treatment, plasma discharge and/or polymerization treatment, easy-adhesive coating treatment, dust-removal treatment or relaxation treatment by heat and/or moisture-conditioning in advance. The flexible substrate 2 is generally formed to have a thickness of 5 to 100 μm.

Upon the preparation of the paint for the formation of a lapping layer in the present invention, it is preferred to use a ball mill, attritor or sand mill as a dispersing machine. It is preferred to filter the paint after dispersion. When inorganic powders which have not been dispersed or have agglutinated, or insoluble matters of the resin remain in the paint, they will become a cause for scratches on the surface to be lapped. Incidentally, filtration is conducted for the purpose of removing the foreign matters from the paint.

Upon production of a lapping tape, the paint, which has been filtered through a filter having a fixed filtration accuracy while or after being mixed with a hardener as needed, is coated onto a non-magnetic substrate which is in the form of a long continuous film drawn from an unwind roll. It is applied by any one of various known coating means such as gravure coating, reverse roll coating or extrusion nozzle coating.

Prior to the coating of the paint, the flexible substrate 2 is generally pre-treated, for the purpose of cleaning or surface control, by various known means such as wet cleaning with water or solvent, dry cleaning with nonwoven cloth or extra-fine fiber cloth as a wiper, or non-contact type cleaning with pressed air, vacuum or ionized air. Sometimes, for improving the adhesion between the paint and flexible substrate 2 or improving the surface to be coated, various known non-contact type surface treatments such as corona discharge, ultraviolet radiation or electron beam radiation are given to the flexible substrate.

The paint coated on the flexible substrate 2 is generally dried by the known drying and evaporating means disposed inside of the drying furnace, such as hot air drier, far infrared radiation drier, electric heater or vacuum apparatus. The drying temperature may range from 40 to 200° C., preferably 60 to 180° C. and more preferably 80 to 150° C. It may be determined as needed according to the heat resistance of the flexible substrate, the kind of the solvent or solid concentration. Drying temperatures less than 40° C. lower the drying efficiency and increase the residual amount of the solvents. Drying temperatures exceeding 200° C., on the other hand, cause drastic evaporation of the solvents from the paint, leading to a deterioration of the surface roughness of the lapping layer. The drying furnace may have a temperature gradient. In the drying furnace, air, inert gas or the like is generally used as a gas atmosphere.

After drying, it is possible to subject the lapping layer 3 to thermosetting treatment at 40 to 80° C. and/or electron beam radiation treatment in order to promote the hardening of the lapping layer.

By cutting into a predetermined shape and secondary processing, the lapping tape of the present invention is produced.

The present invention will next be described more specifically by specific examples. It should however be borne in mind that the present invention is not limited to or by the following examples.

EXPERIMENT EXAMPLE 1

First, the paint for the formation of a lapping layer was prepared according to the following procedure.

Paint for the Formation of a Lapping Layer (1) Preparation of a Binder Solution

| | |
|---|---|
| Phenoxy resin ("PKHH", trade name; product of Phenoxy Associates Inc.) | 20 parts by weight |
| Polyester polyurethane resin ("T-5206", trade name; product of Dainippon Ink & Chemicals) | 80 parts by weight |
| MEK (methyl ethyl ketone) | 140 parts by weight |
| Toluene | 120 parts by weight |
| Cyclohexanone | 140 parts by weight |

The above components were charged in a hypermixer, followed by mixing and stirring for 6 hours, whereby a binder solution was obtained. The binder solution so obtained was subjected to circulating filtration through a depth filter having a 95% cut filtration accuracy of 15.0 μm for 8 hours.

(2) Dispersing Treatment

| | |
|---|---|
| Inorganic powders (silicon carbide, "GC #4000" trade name; product of Fujimi Incorporated) | 500 parts by weight |
| Binder solution (above-described one) | 500 parts by weight |

The above components were charged in an attritor and dispersed for three hours.

(3) Viscosity Adjustment

After the completion of the dispersing treatment, the below-described solvents were charged, followed by dispersion for further one hour.

| | |
|---|---|
| MEK (methyl ethyl ketone) | 80 parts by weight |
| Toluene | 60 parts by weight |
| Cyclohexanone | 80 parts by weight |

After the viscosity adjustment, the paint for the formation of a lapping layer was subjected to circulating filtration through a depth filter having a 95% cut filtration accuracy of 25.0 μm for 8 hours.

(4) Final Paint

To 1220 parts by weight of the paint after filtration, 20 parts by weight of an isocyanate compound ("Colonate L", trade name; product of Nippon Polyurethane Kogyo) were added, followed by stirring and mixing, whereby a final paint for the formation of a lapping layer was prepared.

(Production of a Lapping Tape)

The paint obtained above was coated onto one side of a flexible substrate composed of a 75-μm thick polyethylene terephthalate film in a degree of a predetermined thickness, followed by drying and winding up as a roll.

The dried roll was then cured in a heating oven of 60° C. for 24 hours, followed by cutting into a piece of ¾-inch width, whereby a lapping tape sample was produced. Incidentally, the above-described paint was applied to the flexible substrate with varied coated thickness, whereby lapping tape samples 1 to 7 having lapping layers of various thickness as shown in Table 1 were produced.

Concerning each of the lapping tape samples 1 to 7 so produced, the remaining amount of the solvents was measured and properties such as relative lapping ability, lapping scratches on the head and peeling from the lapping tape were evaluated.

Measurement of the Remaining Amount of a Solvent

The total remaining amount of solvents of a lapping tape sample is found by measuring its coating layer thickness by a precision micrometer, hermetically sealing the sample, which has been cut into a piece of ¾ inch width×1 m length, into a 20-ml vial, leaving it alone at 120° C. for one hour and measuring a gas generated in the vial by a head spacer gas chromatograph ("HSS-2A, GC-9A", product of Shimadzu Corporation). Then, the remaining amount of the solvents per unit volume is found from the coating layer thickness and the volume of the film obtained from the sample size.

Relative Lapping Ability

A ferrite head was lapped with each of the lapping tape samples and a time spent for the lapping of 1 μm of the ferrite head was measured. Relative to the lapping time by Sample No. 4, which was used as a standard, the lapping time of the other samples were indicated. Described specifically, the lapping ability was expressed by a relative value, with the lapping ability of the standard Sample No. 4 as 100. The smaller the value, the better the lapping ability.

Lapping Scratches on the Head

Conditions of the scratches formed on the surface of a ferrite head by the lapping with a lapping tape sample were observed by the optical microscope and evaluation was made in accordance with the following standards for judgment.

◎: Having no scratches

○: Acceptable as a product but having one or two scratches

Δ: Acceptable as a product but having three to five scratches.

X: Not acceptable as a product because having at least six scratches.

Peeling from the Lapping Tape

When a ferrite head was lapped with a lapping tape sample, the presence or absence of peeling of the lapping layer from the lapping tape was observed by a light microscope. The lapping tape was evaluated in accordance with the following standards.

○: No peeling

Δ: Acceptable as a product in spite of small peelings.

X: Not acceptable as a product because of having large peelings.

The above measuring results are shown below in Table 1.

TABLE 1

| Sample No. | Thickness of lapping layer (μm) | Remaining amount of solvents (g/m³) | Relative lapping ability | Lapping scratches on the head | Peeling of lapping tape |
|---|---|---|---|---|---|
| 1 (comparison) | 1.0 | 10 | 78 | x | ○ |
| 2 | 3.0 | 50 | 90 | Δ | ○ |
| 3 | 5.0 | 90 | 96 | ○ | ○ |
| 4 | 15.0 | 200 | 100 | ◎ | ○ |
| 5 | 20.0 | 250 | 101 | ◎ | ○ |
| 6 | 25.0 | 350 | 100 | ◎ | ○ |
| 7 (comparison) | 30.0 | 410 | 102 | ◎ | x |

EXPERIMENT EXAMPLE 2

Lapping tape samples 8 to 14 were prepared in a similar manner to Experiment Example 1 except that the remaining amount of the solvents was changed as shown in Table 2 by changing the drying conditions. The dry thickness of each of the lapping layer was set at 15.0 μm.

Concerning each of the lapping tape samples 8 to 14 so produced, the remaining amount of the solvents was measured and properties such as relative lapping ability, scratches of the head made by lapping and peeling from the lapping tape were evaluated as in Experiment Example 1.

The measuring results are shown below in Table 2. For reference, results of the lapping tape sample 4 obtained in Experiment Example 1 were also included.

TABLE 2

| Sample No. | Remaining amount of solvents (g/m³) | Relative lapping ability | Lapping scratches on the head | Peeling of lapping tape |
|---|---|---|---|---|
| 4 | 200 | 100 | ◎ | ○ |
| 8 | 450 | 110 | ◎ | Δ |
| 9 | 400 | 107 | ◎ | ○ |
| 10 | 100 | 99 | ◎ | ○ |
| 11 | 50 | 93 | ◎ | ○ |
| 12 | 20 | 90 | ○ | ○ |
| 13 (Comparison) | 550 | 150 | ◎ | x |
| 14 (comparison) | 750 | 180 | ◎ | x |

EXPERIMENT EXAMPLE 3

Lapping tape samples 15 to 20 as shown below in Table 3 were prepared in a similar manner to that employed for the lapping tape sample 4 of Experiment Example 1 except that a ratio of the cyclohexanone contained in the paint was changed.

Concerning each of the lapping tape samples 15 to 20 so produced, the remaining amount of the solvents was measured and properties such as relative lapping ability, lapping scratches on the head and peeling from the lapping tape were evaluated as in Experiment Example 1.

The measuring results are shown below in Table 3. For reference, results of the lapping tape sample 4 in Experiment Example 1 were included.

TABLE 3

| Sample No. | Ratio of cyclo-hexanone (wt. %) | Remaining amount of solvents (g/m³) | Relative lapping ability | Lapping scratches on the head | Peeling of lapping tape |
| --- | --- | --- | --- | --- | --- |
| 4 | 35.5 | 200 | 100 | ⊚ | ○ |
| 15 (Comparison) | 15.0 | 90 | 93 | x | ○ |
| 16 | 20.0 | 130 | 96 | ○ | ○ |
| 17 | 25.0 | 160 | 99 | ⊚ | ○ |
| 18 | 50.0 | 320 | 105 | ⊚ | ○ |
| 19 | 60.0 | 450 | 115 | ⊚ | Δ |
| 20 (Comparison) | 65.0 | 530 | 140 | ⊚ | x |

As is apparent from the results of Table 3, it has been found that when the ratio of the cyclohexanone contained in the paint is as low as 15 wt. %, the solvent rapidly evaporates from the coating layer, which deteriorates the surface properties of the lapping layer and the surface to be lapped is inevitably scratched.

EXPERIMENT EXAMPLE 4

Using the lapping tape samples 4 and 13 obtained in the above Experiment Examples, a flexible magnetic disk prepared in advance was lapped and scratches on the surface of the disk and peeling properties of the lapping tape were evaluated. The results are shown below in Table 4.

Lapping Scratches on a Magnetic Disk

Conditions of the scratches formed on the surface of a flexible magnetic disc by the lapping with a lapping tape sample were observed by the optical microscope and evaluation was made in accordance with the following standards for judgment.

○: Having no scratches

X: Not acceptable as a product because of scratches.

Peeling From a Lapping Tape

When a flexible magnetic disk was lapped with a lapping tape sample, the presence or absence of peeling of the lapping layer from the lapping tape was observed by the optical microscope. The lapping tape was evaluated in accordance with the following standards.

○: No peeling

X: Not acceptable as a product because of peelings.

The above measuring results are shown below in Table 4.

TABLE 4

| Sample No. | Remaining amount of solvents (g/m³) | Lapping scratches on the disk surface | Peeling from lapping tape |
| --- | --- | --- | --- |
| 4 | 200 | ○ | ○ |
| 13 (Comparison) | 550 | ○ | x |

The advantages of the present invention are apparent from the above results. Described specifically, the lapping tape of the present invention has, on a flexible substrate, a lapping layer formed by coating the paint for the formation of a lapping layer which contains inorganic powders, a binder and solvents, and then drying. In the lapping tape according to the present invention, the solvents in the paint contain an organic solvent having a boiling point of 120° C. or higher in an amount of 20 to 60 wt. % based on the total amount of inorganic solvents; the lapping layer has a film thickness of 3 to 25 μm; and the remaining amount of the solvents in the lapping layer is 500 g/m³ or lower. The present invention therefore brings about excellent advantages that lapping scratches on the surface to be lapped can be prevented to the utmost, peeling of the lapping layer from the lapping tape can be suppressed, and the lapping tape has excellent lapping ability.

What is claimed is:

1. A lapping tape having, on a flexible substrate, a lapping layer obtained by coating a paint for the formation of a lapping layer which contains inorganic powders, a binder and solvents, and then drying, wherein:

said solvents in the paint contain an organic solvent having a boiling point of not less than 120° C. in an amount of 20 to 60 wt. % based on the total amount of organic solvents;

said lapping layer has a thickness of 3 to 25 μm; and the remaining amount of said solvents in the lapping layer is not greater than 500 g/m³.

2. A lapping tape according to claim 1, wherein the remaining amount of the solvents falls within a range of from 20 to 500 g/m³.

3. A lapping tape according to claim 1, wherein the remaining amount of the solvents falls within a range of from 20 to 400 g/m³.

4. A lapping tape according to claim 1, wherein said organic solvent having a boiling point of not less than 120° C. is at least one solvent selected from the group consisting of cyclohexanone, xylene, butyl acetate and amyl acetate.

5. A lapping tape according to claim 1, wherein said organic solvent having a boiling point of not less than 120° C. is cyclohexanone.

6. A lapping tape according to claim 1, wherein said organic solvent having a boiling point of not less than 120° C. is contained in an amount of 25 to 50 wt. % based on the total amount of organic solvents.

7. A lapping tape according to claim 1, wherein the lapping layer has a thickness ranging from 5 to 20 μm.

* * * * *